United States Patent
Jorgensen

(10) Patent No.: US 9,008,099 B2
(45) Date of Patent: Apr. 14, 2015

(54) METHOD AND SYSTEM FOR SLIDING WINDOW PROCESSING OF A DATAGRAM

(75) Inventor: Steven Glen Jorgensen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 13/304,036

(22) Filed: Nov. 23, 2011

(65) Prior Publication Data

US 2013/0128893 A1    May 23, 2013

(51) Int. Cl.
*H04L 12/28*    (2006.01)
*H04L 12/807*    (2013.01)
*H04L 29/06*    (2006.01)

(52) U.S. Cl.
CPC .................. *H04L 47/27* (2013.01); *H04L 69/22* (2013.01)

(58) Field of Classification Search
USPC ................. 370/477, 394, 252, 389, 412, 401; 375/240.26
See application file for complete search history.

(56) References Cited

U.S. PATENT DOCUMENTS

| | | | |
|---|---|---|---|
| 6,965,615 B1 | 11/2005 | Kerr et al. | |
| 7,283,556 B2 * | 10/2007 | Mullendore et al. | 370/458 |
| 7,434,221 B2 | 10/2008 | Hooper et al. | |
| 7,529,242 B1 | 5/2009 | Lyle | |
| 8,379,672 B2 * | 2/2013 | Wiegand | 370/477 |
| 2004/0240473 A1 | 12/2004 | Kumar et al. | |

FOREIGN PATENT DOCUMENTS

| | | |
|---|---|---|
| CN | 101394252 A | 3/2009 |
| JP | 11234331 A | 8/1999 |

* cited by examiner

*Primary Examiner* — Chandrahas Patel

(57) ABSTRACT

A method for sliding window processing of a datagram split into packets, may include processing entire strings of adjacent consecutive packets of the datagram regardless the order of the packets using parallel processors. The method may also include processing adjacent ends of the strings of the adjacent consecutive packets while maintaining the order of the adjacent ends to correspond to the order of the consecutive packets.

20 Claims, 4 Drawing Sheets

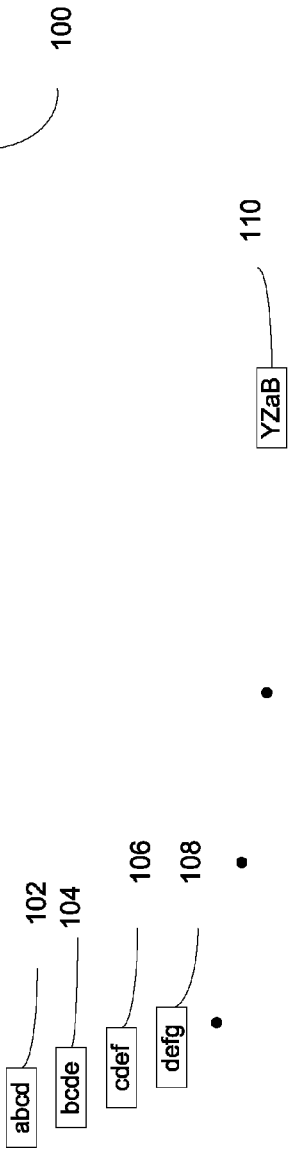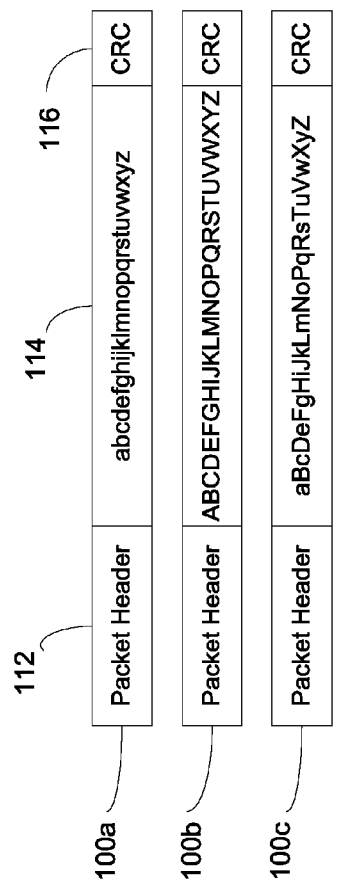
Fig. 1A
Fig. 1B

METHOD AND SYSTEM FOR SLIDING WINDOW PROCESSING OF A DATAGRAM

BACKGROUND

"Regular expression" processing typically refers to processing of data which is aimed at finding a specific expression (e.g. words, character patterns, etc.) in a lengthy string of characters.

When performing a search for a regular expression in a datagram containing a long string of characters (hereinafter referred to as "processing", for brevity) that has been divided into a series of packets, it is usually done by processing the packets in an orderly manner. Typically, this would require that all of the packets are processed by a single processing unit. At high bandwidths such ordered processing would render the processing system inefficient and slow, thereby greatly reducing the appeal of performing such processing by high-bandwidth systems.

BRIEF DESCRIPTION OF THE DRAWINGS

Embodiments of the present invention are described in the following detailed description and illustrated in the accompanying drawings in which:

FIG. 1A illustrates processing of a long string using a sliding window algorithm (prior art).

FIG. 1B illustrates processing of a datagram by a single processing unit, in an orderly manner (prior art).

DETAILED DESCRIPTION

Figure 2:
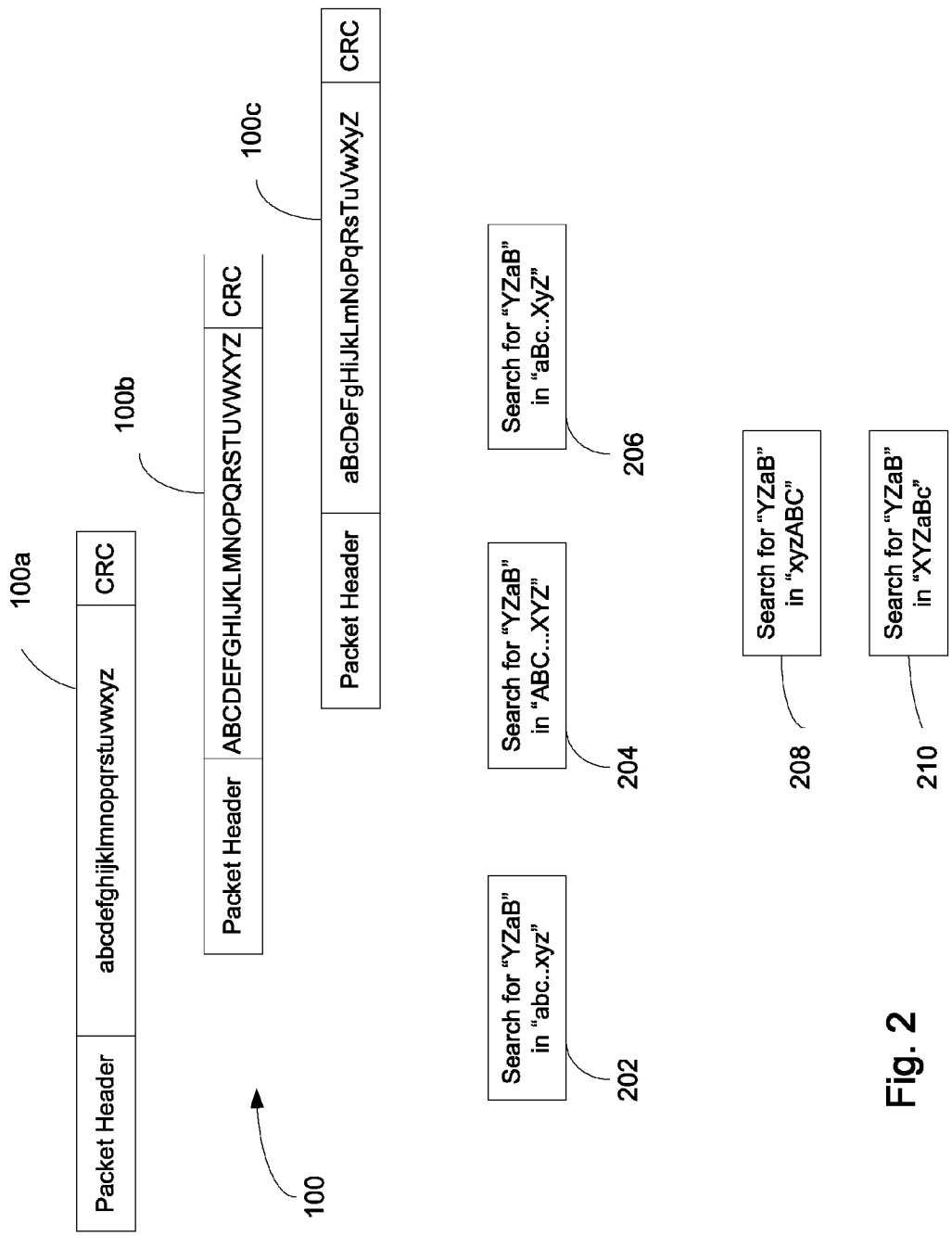
FIG. 2 illustrates processing of a datagram according to an example of the present invention.
Figure 3:
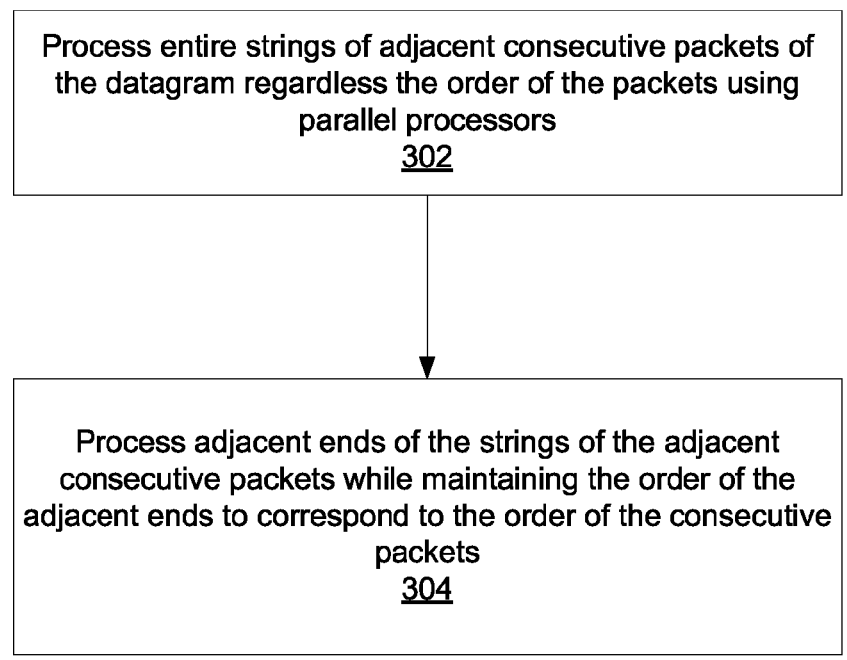
FIG. 3 illustrates a method for sliding window processing of a datagram, in accordance with an example.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although examples of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

FIG. 1A illustrates processing of a long string using a sliding window algorithm (prior art).

In the example depicted in FIG. 1 string 100 which comprises a long string of characters is to be searched for a regular expression (e.g. the string "YZab"). The processing method may involve using a sliding window algorithm.

A sliding window algorithm typically places a buffer between the application program and the data flow. Data received is stored in the buffer, from whence the application can read at its own pace. As the application reads data, buffer space is freed up to accept more input from the network. The window is the amount of data that can be "read ahead".

In the example shown in FIG. 1A the window size is 4 characters. First, the window covers the partial string "abcd" (102). Then the window is moved one step—"a" is removed and "e" becomes covered by the window, thus partial string "bcde" (104) is considered. Next "b" is removed and "f" is included, thus considering partial string "cdef" (106). Further, "c" is removed and "g" is included, so that "defg" is now considered (108). This process continues until the sliding window covers the partial string "YZab" (110), which is the searched for expression. The process may further continue by sliding the window the entire length of string 100 in search for additional occurrences of the searched for string.

Commonly, searching for a regular expression in a datagram which is divided and transferred in packets involved performing the search on the packets in an orderly manner, following the order of the packets.

FIG. 1B illustrates processing of a datagram by a single processing unit, in an orderly manner (prior art).

Datagram 100 (see FIG. 1A) is now divided into packets (100a, 100b and 100c in the example shown in FIG. 1B). Each packet typically includes a packet header 112, payload 114 and CRC (Cyclic Redundancy Check) element.

Hereinafter, "processing" is it understood to refer to the processing of the payload strings, unless specifically stated otherwise.

Typically, the processing of packets 100a, 100b and 100c is done in an orderly manner, first processing the payload of packet 100a, then packet 100b and lastly packet 100c. When processing the tailing string end of packet 100a using a sliding window algorithm with a window whose size is N characters, the last window to process solely characters from packet 100a would cover the last N characters in that packet. Then, the next window would cover the last N−1 characters of packet 100a and the first character from packet 100b. Further, the next window would cover the last n−2 characters of packet 100a and the first 2 characters from packet 100b. This would continue until a window covers the last character of packet 100a and the first N−1 characters of packet 100b. The next window would then move on to packet 100b starting from the first N characters of packet 100b and so on. Thus the packets 100a, 100b and 100c making up string 100 are processed in an orderly manner, one by one. In order to find the string "YZaB" Packet 100a is processed before Packet 100b, and packet 100b is processed before packet 100c, saving the last N−1 characters of the payload of a previous packet so as to allow processing the first N−1 characters of the next packet. This enables searching for the string across windows that span the packets.

A sliding window algorithm may only process a fragment of the string found in any of packets 100a, 100b and 100c at a time. Specifically, when processing a plurality of datagram packets, their order is actually only important when processing the adjacent string ends of consecutive packets—the tailing string end of a first packet and the leading string end of the next consecutive packet.

It is evident (see packets 100*a*, 100*b* and 100*c* in FIG. 1B or FIG. 2, for example) that the order of the datagram packets matters only when the sliding window algorithm processes a string the size of the window which is partially made of the end characters of a packet, e.g. the string "xyz" at the end of the string found in packet 100*a*, in the case of a 4-character sliding window, and from the first characters of the next consecutive packet, e.g., the string "ABC" at the beginning of the string of packet 100*b*, in the case of a 4-character sliding window. More generally, in the case of a sliding window the size of N characters, the order of the packets matters only when considering the string which is made up of the last N−1 characters of a first packet, and of the first N−1 characters of a second packet, which is a consecutive (the next) packet with respect to the first packet. This is so because when performing a sliding window algorithm on a datagram split into packets, there exist N−1 states in which a sliding window the size of N characters, covers some characters from the end of a first packet and some characters from the beginning of a second consecutive packet, and for these states, the order of the packets matters. These states may be presented in the following table:

TABLE 1

States of a sliding window the size of N characters covering strings made up of some characters located at the end of a string of a first packet and some characters located at the beginning of a second consecutive packet

| Number of characters of first packet | Number of characters of second packet |
|---|---|
| N−1 | 1 |
| N−2 | 2 |
| N−3 | 3 |
| N−4 | 4 |
| ... | ... |
| 2 | N−2 |
| 1 | N−1 |

The string of each packet—that is all the characters of the string of each of the packets—may be processed regardless of the order of the packets. This facilitates processing the strings of all of the packets that make up the datagram in any particular order.

In accordance with an example, the strings of all of the packets may be processed in parallel.

FIG. 2 illustrates processing of a datagram according to an example of the present invention.

Datagram 100 contains a long string which is divided and included in the payload of three consecutive packets 100*a*, 100*b* and 100*c*.

Thus each of the strings of packets 100*a*, 100*b* and 100*c*, may be processed regardless of the order of the packets.

However, as the sliding window size in this example is 4 characters, the last 3 characters of the string of packet 100*a*, e.g. "xyz", are to be considered with respect to the first 3 characters of the next consecutive packet 100*b*, e.g. "ABC". In order to properly process these portions the last 3 characters of packet 100*a* will be considered to be leading the first 3 characters of the next consecutive packet 100*b*—this is the proper order, since it is the order in which the lengthy string of the datagram is arranged. The sliding window is to cover all possible states of coverage of a string that represents the proper order of the characters of the adjacent ends of the strings of consecutive packets with respect to the lengthy string of datagram 100. The string includes the characters "xyzABC", given a 4-character sliding window, maintaining the order of the adjacent string ends to correspond to the order of the consecutive packets.

Similarly, the last 3 characters of the string of packet 100*b*, e.g. "XYZ", and the first 3 characters of the string of packet 100*c*, e.g. "aBc" would be considered in their proper order, in the form of a string that includes "XYZaBc", and not the other way around ("aBcXYZ").

Thus, for example, the search for the expression "YZaB" may be carried out by separately processing, for example, in parallel, the strings of the datagram packets—string 202 of packet 100*a*, string 204 of packet 100*b* and string 206 of packet 100*c*.

"Adjacent consecutive packets" refer to any pair of packets of the datagram which are adjacent to each other and consecutively ordered (e.g. the pairs of first and second packets, the second and third packets, the third and forth packets etc.).

The adjacent string ends of two adjacent datagram packets may only be processed by relating to the order of these packets—the string end of the first packet considered to be leading the adjacent string end of the next packet.

A method 300 for sliding window processing of a datagram split into packets may include processing 302 entire strings of adjacent consecutive packets of the datagram regardless the order of the packets using parallel processors. Method 300 may also include processing 304 adjacent ends of the strings the adjacent consecutive packets while maintaining the order of the adjacent string ends to correspond to the order of the consecutive packets.

Figure 4:
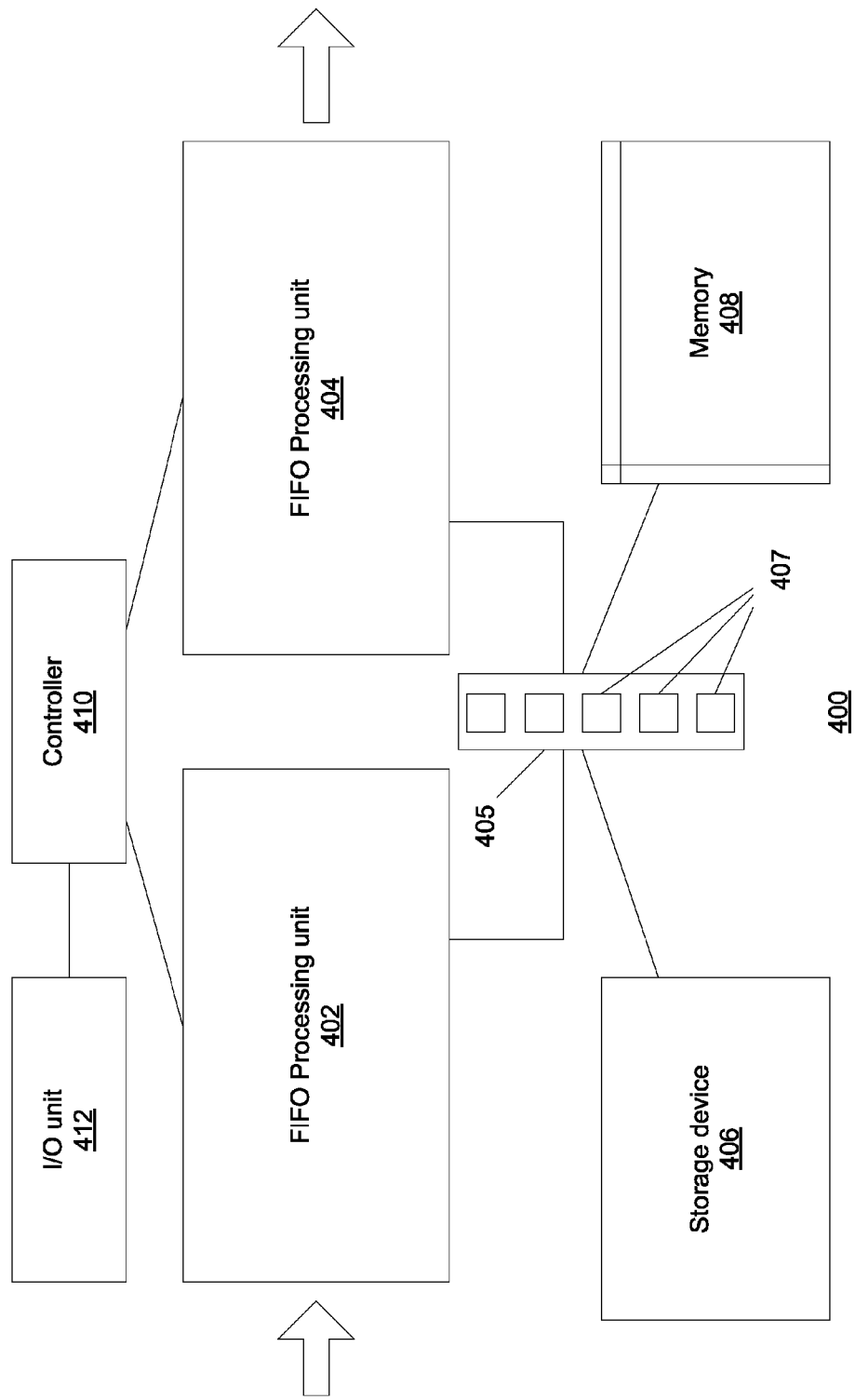
FIG. 4 illustrates a system for sliding window processing of a datagram, in accordance with an example.

FIG. 4 illustrates a system for sliding window processing of a datagram split into packets. System 400 may include controller 410 which controls the operation of a first FIFO (First-In-First-Out) engine 402 into which all of the datagram packets are forced. As a packet is placed into the first FIFO engine 402 its payload is dispatched in parallel to a processing engine 405 which may include parallel processors 407 and which updates the state when done. Packets can only be removed from the first FIFO engine when initial processing is completed. Initial processing of each packet consists of searching the string included in the payload of the packet from the beginning of the payload to the end of that payload. This leaves a string made up of the tailing string end of the payload of a first packet about the size of the sliding window (actually at the size of N−1 characters, given that the size of the sliding window is N characters) and of the leading string end of a second consecutive packet of the same size, that has only been partially processed since the leading end of the string of the payload of the second consecutive packet must be concatenated with the tailing end of the string of the payload of the previous packet.

When the packet reaches the head of the initial processing FIFO engine (that is, when all the packets in front of that packet have been removed) and the processing is complete, the packet is placed into a second FIFO engine 404. FIFO engine 404 may be served one packet at a time in order for secondary processing. During the secondary processing the adjacent ends of the strings of the payloads of adjacent consecutive packets are processed by a single processor which may be, for example, one of the processors 407 of processing engine 405 while maintaining the order of the adjacent string ends to correspond to the order of the consecutive packets.

The tailing string end of a currently processed string of a payload of a packet may be stored for processing it with the leading string end of the string of the payload of the next consecutive packet in the stream. Other states from the initial processing may be stored as well (e.g. was there a match in the first packet and where).

In order to determine whether a processing unit (e.g. the first FIFO processing unit) would keep up with incoming traffic a comparison between the time it takes a single processor to process the adjacent string ends of two consecutive packets compared with the fastest arrival time on the fastest Interface may be made. This would be compared to having to process the entire packet as well as the tailing string end of the previous packet in a single stage processing. It is asserted that using the method and system in accordance with an example of the invention may yield faster processing times.

Storage device 406, such as, for example, a hard disk, or any other non-transitory computer readable medium may be used to store a program that includes instructions executable by either of the FIFO processing units 402 and 404 for sliding window processing of a datagram split into packets, in accordance with examples.

Memory 408 may be provided for storing temporal information in the course of execution of such program.

Input/Output (I/O) device 412 may be provided, such as for example one or more devices selected from the group of device including keyboard, pointing device, touch-sensitive screen, display device, printer, audio signal generator, so as to allow a user to input information and/or commands and to allow outputting information, such as alerts, audio signals, video information etc.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

Such instructions may be for example loaded into one or more processors and executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for sliding window processing of a datagram split into packets, the method comprising:
   processing entire strings of adjacent consecutive packets of the datagram regardless of the order of the packets using parallel processors; and
   processing adjacent ends of the strings of the adjacent consecutive packets while maintaining the order of the adjacent ends to correspond to the order of the consecutive packets.

2. The method of claim 1, wherein the sliding window has a size of N characters and wherein each of the adjacent ends of each of the adjacent consecutive packets includes N−1 characters.

3. The method of claim 1, wherein the processing of adjacent ends of the strings of the adjacent consecutive packets while maintaining the order of the adjacent ends to correspond to the order of the consecutive packets comprises concatenating a tailing string end of a first packet of the adjacent consecutive packets to a leading string end of a second consecutive packet of the adjacent consecutive packets.

4. The method of claim 1, further comprising storing a tailing string end of a first packet of the adjacent consecutive packets for processing it with a leading string end of the next packet of the adjacent consecutive packets.

5. The method of claim 4, further comprising storing other states determined in the processing of the entire strings of the adjacent consecutive packets.

6. The method of claim 1, wherein the processing of adjacent ends of the strings of the adjacent consecutive packets while maintaining the order of the adjacent ends to correspond to the order of the consecutive packets is performed by a single processor.

7. A non-transitory computer readable medium having stored thereon instructions for sliding window processing of a datagram split into packets, which when executed by a processor cause the processor to perform the method of:
   processing entire strings of adjacent consecutive packets of the datagram regardless of the order of the packets using parallel processors, this processing determining whether a string is found within said datagram, said datagram comprising a longer string split among said packets; and
   processing adjacent ends of segments of said longer string from adjacent consecutive packets while maintaining the order of the adjacent ends to correspond to the order of the consecutive packets, this processing determining whether said string is found within any combination of said adjacent ends of segments of said longer string.

8. The non-transitory computer readable medium of claim 7, wherein the sliding window has a size of N characters and wherein each of the adjacent ends of segments of said longer strong from each of the adjacent consecutive packets includes N−1 characters.

9. The non-transitory computer readable medium of claim 7, wherein the processing of adjacent ends of the segments of said longer string from the adjacent consecutive packets while maintaining the order of the adjacent ends to correspond to the order of the consecutive packets comprises concatenating a tailing string end of a first packet of the adjacent consecutive packets to a leading string end of a second consecutive packet of the adjacent consecutive packets.

10. The non-transitory computer readable medium of claim 7, the instructions further comprising storing a tailing string end of a first packet of the adjacent consecutive packets for processing it with a leading string end of the next packet of the adjacent consecutive packets.

11. The non-transitory computer readable medium of claim 10, the instructions further comprising storing other states determined in the processing of the entire strings of the adjacent consecutive packets.

12. The non-transitory computer readable medium of claim 7, wherein the processing of adjacent ends of the strings of the adjacent consecutive packets while maintaining the order of the adjacent ends to correspond to the order of the consecutive packets is performed by a single processor.

13. A system for sliding window processing of a datagram split into packets, the system comprising:

a first processing unit to process entire strings of adjacent consecutive packets of the datagram regardless of the order of the packets using parallel processors so as to determine if a search string is found within said datagram; and a second processing unit to process adjacent ends of strings of said datagram in the adjacent consecutive packets while maintaining the order of the adjacent ends to correspond to the order of the consecutive packets so as to determine if said search string is found within a combination of said adjacent ends of strings of said divided datagram.

14. The system of claim 13, wherein the first processing unit is a first FIFO processing unit.

15. The system of claim 13, comprising a storage device and memory.

16. The system of claim 13, configured to store a tailing string end of a first packet of the adjacent consecutive packets to process it with a leading string end of the next packet of the adjacent consecutive packets.

17. The system of claim 16, further configured to store other states determined in the processing of the entire strings of the adjacent consecutive packets.

18. The system of claim 13, wherein the second processing unit is a second FIFO processing unit.

19. The system of claim 18 the second FIFO processing unit comprises a single processor.

20. The system of claim 19, wherein the single processor is used to process the adjacent ends of the strings of the adjacent consecutive packets while maintaining the order of the adjacent ends to correspond to the order of the consecutive packets.

* * * * *